United States Patent [19]

Lin et al.

[11] Patent Number: 5,552,208
[45] Date of Patent: Sep. 3, 1996

[54] HIGH STRENGTH COMPOSITE

[75] Inventors: Leroy C.-T. Lin, Richmond; Laura G. Wilson; Ashok Bhatnagar, both of Chester, all of Va.; Hsin L. Li, Parsippany, N.J.

[73] Assignee: AlliedSignal Inc., Morristown, N.J.

[21] Appl. No.: 148,732

[22] Filed: Oct. 29, 1993

[51] Int. Cl.$^6$ .............................. B32B 5/12; D04H 3/02; F41H 1/02
[52] U.S. Cl. ..................... 428/113; 428/229; 428/245; 428/286; 428/294; 428/902; 428/911; 2/2.5
[58] Field of Search ................... 428/229, 245, 428/286, 294, 902, 911, 113; 2/2.5

[56] References Cited

U.S. PATENT DOCUMENTS

| | | | |
|---|---|---|---|
| 3,881,978 | 5/1975 | Livingston et al. | 156/247 |
| 4,232,069 | 11/1980 | Windecker | 428/47 |
| 4,377,458 | 3/1983 | Watanabe | 204/159.16 |
| 4,403,012 | 9/1983 | Harpell et al. | 428/290 |
| 4,457,985 | 7/1984 | Harpell et al. | 428/224 |
| 4,501,856 | 2/1985 | Harpell et al. | 525/240 |
| 4,543,286 | 9/1985 | Harpell et al. | 428/288 |
| 4,563,392 | 1/1986 | Harpell et al. | 428/394 |
| 4,584,347 | 4/1986 | Harpell et al. | 525/119 |
| 4,613,535 | 9/1986 | Harpell et al. | 428/113 |
| 4,623,574 | 11/1986 | Harpell et al. | 428/113 |
| 4,650,710 | 3/1987 | Harpell et al. | 428/263 |
| 4,681,792 | 7/1987 | Harpell et al. | 428/102 |
| 4,737,401 | 4/1988 | Harpell et al. | 428/252 |
| 4,737,402 | 4/1988 | Harpell et al. | 428/252 |
| 4,748,064 | 5/1988 | Harpell et al. | 428/113 |
| 4,820,568 | 4/1989 | Harpell et al. | 428/113 |
| 4,883,700 | 11/1989 | Harpell et al. | 428/113 |
| 4,916,000 | 4/1990 | Li et al. | 428/105 |
| 4,953,234 | 9/1990 | Li et al. | 2/412 |
| 5,006,390 | 4/1991 | Kavesh et al. | 428/105 |
| 5,061,545 | 10/1991 | Li et al. | 428/195 |
| 5,112,667 | 5/1992 | Li et al. | 428/113 |
| 5,124,195 | 6/1992 | Harpell et al. | 428/245 |
| 5,165,989 | 11/1992 | Bhatnagar et al. | 428/245 |
| 5,167,876 | 12/1992 | Lem et al. | 252/602 |
| 5,175,040 | 12/1992 | Harpell et al. | 428/113 |
| 5,185,195 | 2/1993 | Harpell et al. | 428/102 |
| 5,187,023 | 2/1993 | Prevorsek et al. | 428/911 |
| 5,196,252 | 3/1993 | Harpell | 428/102 |
| 5,229,199 | 7/1993 | Miner et al. | 428/272 |
| 5,252,212 | 11/1993 | Waters | 427/35.7 |
| 5,330,820 | 7/1994 | Li et al. | 428/113 |

FOREIGN PATENT DOCUMENTS

| | | |
|---|---|---|
| 0315086 | 5/1989 | European Pat. Off. . |
| 0336360 | 10/1989 | European Pat. Off. . |
| 0355059 | 2/1990 | European Pat. Off. . |
| 55-082112 | 6/1980 | Japan . |
| 59-232849 | 6/1983 | Japan . |
| 3152645 | 12/1986 | Japan . |
| WO89/01956 | 3/1989 | WIPO . |
| WO91/08895 | 6/1991 | WIPO . |
| WO9112136 | 8/1991 | WIPO . |

*Primary Examiner*—James Withers
*Attorney, Agent, or Firm*—Renee J. Rymarz; Melanie L. Brown

[57] ABSTRACT

An article made from at least one network of high strength fibers and a matrix composition that includes a vinyl ester and diallyl phthalate. Preferably, the article is made from at least one prepreg element which includes at least two adjacent layers of the high strength fiber network in the vinyl ester-containing matrix composition. The prepreg element is made by applying a mixture of vinyl ester, diallyl phthalate and a carbon-carbon saturated solvent to the high strength fiber network.

23 Claims, 1 Drawing Sheet

HIGH STRENGTH COMPOSITE

BACKGROUND OF THE INVENTION

The present invention relates to a composite, particularly one that can be used in ballistic resistant articles, which includes a network of high strength fibers in a vinyl ether matrix material.

Various constructions are known for ballistic resistant composites used in ballistic resistant articles such as helmets, panels, and vests. These composites display varying degrees of resistance to penetration by high speed impact from projectiles such as BB's, bullets, shells, shrapnel, glass fragments and the like. U.S. Pat. Nos. 5,196,252; 5,187,023; 5,185,195; 5,175,040; 5,167,876; 5,165,989; 5,124,195; 5,112,667; 5,061,545; 5,006,390; 4,953,234; 4,916,000; 4,883,700; 4,820,568; 4,748,064; 4,737,402; 4,737,401; 4,681,792; 4,650,710; 4,623,574; 4,613,535; 4,584,347; 4,563,392; 4,543,286; 4,501,856; 4,457,985; and 4,403,012 and PCT Publication No. WO 91/12136 describe ballistic resistant composites which include high strength fibers made from materials such as extended chain ultra-high molecular weight polyethylene.

Typically these fibers are coated, embedded or impregnated in a polymeric matrix material. During production of such composites the matrix materials must be dissolved in a solvent so that thay are in a liquid form for application to the high strength fibers. The solvent then must be removed, usually by drying, in order to fabricate the composite.

Of particular interest among the above disclosures is the description of the materials that can be used for the matrix material that is found in PCT Publication No. WO 91/12136; column 14, lines 12–36, of U.S. Pat. No. 5,167,876; column 12, lines 25–39 of U.S. Pat. No. 4,820,459; and column 3, lines 1–5 and Example 1 of U.S. Pat. No. 5,165,989. These disclosures describe the use of a vinyl ester as the matrix material. This vinyl ester matrix material is the condensation product of epoxide resins and unsaturated acids that is diluted in a compound having double bond unsaturation such as a vinyl aromatic monomer as for example styrene, vinyl toluene and diallyl phthalate. A problem with these vinyl ester matrix materials is that the required unsaturated solvents have a high boiling point, thus necessitating more energy and time for removal of the solvent. A further problem with many of the organic solvents is that they require strict handling and disposal procedures because of potential environmental or health hazards.

A need exists, therefore, for vinyl ester matrix materials which do not require such troublesome solvents, but which provide adequate levels of ballistic performance, mechanical performance and chemical resistance.

SUMMARY OF THE INVENTION

It is therefore an object of the present invention to provide a composite which includes a matrix material that utilizes a more convenient solvent, but offers a high level of ballistic performance, mechanical performance and chemical resistance. In accomplishing the foregoing object there is provided according to the present invention an article comprising at least one network of high strength fibers in a matrix composition, the high strength fibers having a tenacity of at least about 7 g/d, a tensile modulus of at least about 150 g/d and an energy-to-break of at least about 8 J/g, wherein the matrix composition comprises at least one thermoset vinyl ester and diallyl phthalate. In a preferred embodiment the article is a ballistic resistant article such as a helmet which includes more than one layer of the high strength fiber network in the vinyl ester-containing matrix composition.

According to a further embodiment of the invention, there is provided a prepreg element which includes at least two layers of the high strength fiber network in the vinyl ester-containing matrix composite. A plurality of such prepreg elements can be molded into a composite.

There also is provided according to the invention a method for producing an article that includes at least one network of high strength fibers in a matrix composition, wherein the high strength fibers have a tenacity of at least about 7 g/d, a tensile modulus of at least about 150 g/d and an energy-to-break of at least about 8 J/g, the method comprising applying a mixture of a thermoset vinyl ester, diallyl phthalate and a carbon-carbon saturated solvent and consolidating the coated high strength fiber network to remove the carbon-carbon saturated solvent.

Further objects, features and advantages of the present invention will become apparent from the detailed description of preferred embodiments that follows.

BRIEF DESCRIPTION OF THE DRAWING

The invention will be described below in more detail with reference to the drawing, wherein.

DETAILED DESCRIPTION OF THE INVENTION

Figure 1:
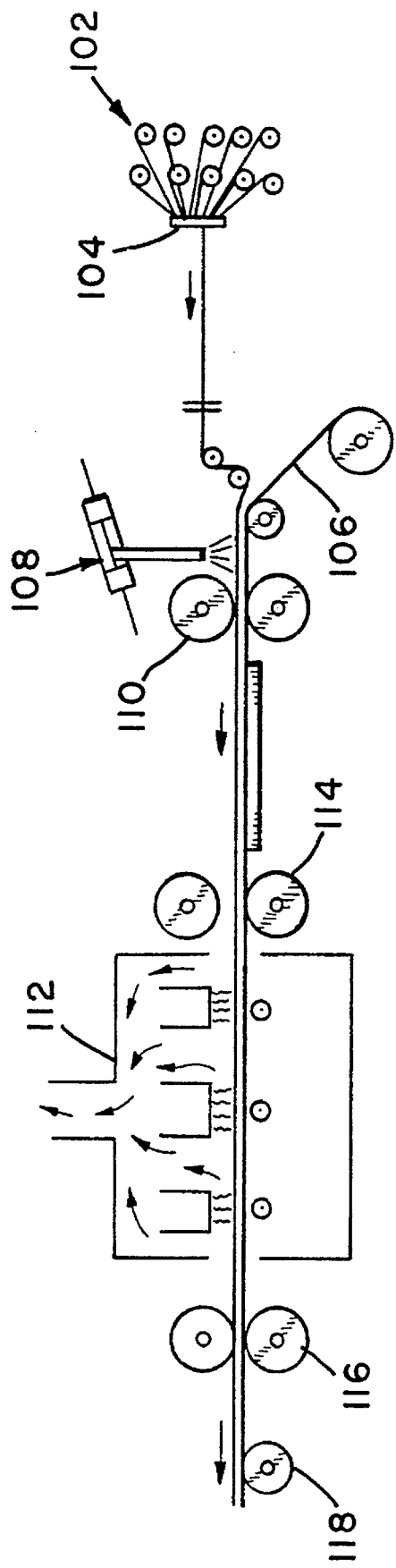
FIG. 1 is a schematic representation of a process for making a fiber network layer of the invention.

The present invention provides an improved composite which is particularly useful in ballistic resistant "hard" armor articles. By "hard" armor is meant an article, such as a helmet or panels for military vehicles, which has sufficient mechanical strength so that it maintains structural rigidity when subjected to a significant amount of stress and is capable of being free-standing without collapsing.

As used herein, "fiber" denotes an elongate body, the length dimension of which is much greater than the transverse dimensions of width and thickness. Accordingly, "fiber" includes monofilament multi-filament, ribbon, strip, staple and other forms of chopped, cut or discontinuous fiber and the like having regular or irregular cross-sections. "Fiber" includes a plurality of any one of the above or a combination of the above.

The cross-sections of filaments for use in this invention may vary widely. They may be circular, flat or oblong in cross-section. They also may be of irregular or regular multi-lobal cross-section having one or more regular or irregular lobes projecting from the linear or longitudinal axis of the filament. It is particularly preferred that the filaments be of substantially circular, flat or oblong cross-section, most preferably the former.

As used herein, "fiber network" denotes a plurality of fibers arranged into a predetermined configuration or a plurality of fibers grouped together to form a twisted or untwisted yarn, which yarns are arranged into a predetermined configuration. The fiber network can have various configurations. For example, the fibers or yarn may be formed as a felt or other nonwoven, knitted or woven into a network, or formed into a network by any conventional techniques. According to a particularly preferred network configuration, the fibers are unidirectionally aligned so that they are substantially parallel to each other along a common fiber direction.

High strength fibers for use in this invention are those having a tenacity equal to or greater than about 7 g/d, a tensile modulus equal to or greater than about 150 g/d and an energy-to-break equal to or greater than about 8 Joules/gram (J/g). Preferred fibers are those having a tenacity equal to or greater than about 10 g/d, a tensile modulus equal to or greater than about 200 g/d and an energy-to-break equal to or greater than about 20 J/g. Particularly preferred fibers are those having a tenacity equal to or greater than about 16 g/d, a tensile modulus equal to or greater than about 400 g/d, and an energy-to-break equal to or greater than about 27 J/g. Amongst these particularly preferred embodiments, most preferred are those embodiments in which the tenacity of the fibers is equal to or greater than about 22 g/d, the tensile modulus is equal to or greater than about 900 g/d, and the energy-to-break is equal to or greater than about 27 J/g. In the practice of this invention, fibers of choice have a tenacity equal to or greater than about 28 g/d, the tensile modulus is equal to or greater than about 1200 g/d and the energy-to-break is equal to or greater than about 40 J/g.

Useful high strength fibers include extended chain polyolefin fibers, particularly extended chain polyethylene (ECPE) fibers, aramid fibers, polyvinyl alcohol fibers, polyacrylonitrile, liquid crystal copolyester, glass and carbon fibers.

U.S. Pat. No. 4,457,985 generally discusses such extended chain polyethylene and polypropylene fibers, and the disclosure of this patent is hereby incorporated by reference to the extent that it is not inconsistent herewith. In the case of polyethylene, suitable fibers are those of weight average molecular weight of at least 150,000, preferably at least one million and more preferably between two million and five million. Such extended chain polyethylene fibers may be grown in solution as described in U.S. Pat. No. 4,137,394 to Meihuzen et al., or U.S. Pat. No. 4,356,138 of Kavesh et al., issued Oct. 26, 1982, or a filament spun from a solution to form a gel structure, as described in German Off. No. 3,004, 699 and GB No. 2051667, and especially as described in U.S. Pat. No. 4,413,110. As used herein, the term of polyethylene shall mean a predominantly linear polyethylene material that may contain minor amounts of chain branching or comonomers not exceeding 5 modifying units per 100 main chain carbon atoms, and that may also contain admixed therewith not more than about 50 wt % of one or more polymeric additives such as alkene-1-polymers, in particular low density polyethylene, polypropylene or polybutylene, copolymers containing mono-olefins as primary monomers, oxidized polyolefins, graft polyolefin copolymers and polyoxymethylenes, or low molecular weight additives such as anti-oxidants, lubricants, ultraviolet screening agents, colorants and the like which are commonly incorporated by reference. Depending upon the formation technique, the draw ratio and temperatures, and other conditions, a variety of properties can be imparted to these filaments. The tenacity of the filaments should be at least 15 grams/denier, preferably at least 20 grams/denier, more preferably at least 25 grams/denier and most preferably at least 30 grams/denier. Similarly, the tensile modulus of the filaments, as measured by an Instron tensile testing machine, is at least 300 grams/denier, preferably at least 500 grams/denier and more preferably at least 1,000 grams/denier and most preferably at least 1,200 grams/denier. These highest values for tensile modulus and tenacity are generally obtainable only by employing solution grown or gel filament processes. Many of the filaments have melting points higher than the melting point of the polymer from which they were formed. Thus, for example, high molecular weight polyethylene of 150,000, one million and two million generally have melting points in the bulk of 138° C. The highly oriented polyethylene filaments made of these materials have melting points of from about 7° to about 13° C. higher. Thus, a slight increase in melting point reflects the crystalline perfection and higher crystalline orientation of the filaments as compared to the bulk polymer.

Similarly, highly oriented extended chain polypropylene fibers of weight average molecular weight at least 200,000, preferably at least one million and more preferably at least two million may be used. Such extended chain polypropylene may be formed into reasonably well oriented filaments by the techniques prescribed in the various references referred to above, and especially by the technique of U.S. Pat. No. 4,413,110. Since polypropylene is a much less crystalline material than polyethylene and contains pendant methyl groups, tenacity values achievable with polypropylene are generally substantially lower than the corresponding values for polyethylene. Accordingly, a suitable tenacity is at least 8 grams/denier, with a preferred tenacity being at least 11 grams/denier. The tensile modulus for polypropylene is at least 160 grams/denier, preferably at least 200 grams/denier. The melting point of the polypropylene is generally raised several degrees by the orientation process, such that the polypropylene filament preferably has a main melting point of at least 168° C., more preferably at least 170° C. The particularly preferred ranges for the above-described parameters can advantageously provide improved performance in the final article. Employing fibers having a weight average molecular weight of at least about 200,000 coupled with the preferred ranges for the above-described parameters (modulus and tenacity) can provide advantageously improved performance in the final article.

High molecular weight polyvinyl alcohol (PV-OH) fibers having high tensile modulus are described in U.S. Pat. No. 4,440,711 to Y. Kwon, et al., which is hereby incorporated by reference to the extent it is not inconsistent herewith. High molecular weight PV-OH fibers should have a weight average molecular weight of at least about 200,000. Particularly useful PV-OH fibers should have a modulus of at least about 300 g/denier, a tenacity of at least about 7 g/denier (preferably at least about 10 g/denier, more preferably at about 14 g/denier and most preferably at least about 17 g/denier), and an energy to break of at least about 8 joules/g. PV-OH fibers having a weight average molecular weight of at least about 200,000, a tenacity of at least about 10 g/denier, a modulus of at least about 300 g/denier, and an energy to break of about 8 joules/g are more useful in producing a ballistic resistant article. PV-OH fiber having such properties can be produced, for example, by the process disclosed in U.S. Pat. No. 4,599,267.

In the case of polyacrylonitrile (PAN), the PAN fiber should have a weight average molecular weight of at least about 400,000. Particularly useful PAN fiber should have a tenacity of at least about 10 g/denier and an energy to break of at least about 8 joule/g. PAN fiber having a molecular weight of at least about 400,000, a tenacity of at least about 15 to 20 g/denier and an energy to break of at least about 8 joule/g is most useful; and such fibers are disclosed, for example, in U.S. Pat. No. 4,535,027.

In the case of aramid fibers, suitable aramid fibers formed principally from aromatic polyamide are described in U.S. Pat. No. 3,671,542, which is hereby incorporated by reference. Preferred aramid fibers will have a tenacity of at least about 20 g/d, a tensile modulus of at least about 400 g/d and an energy-to-break at least about 8 joules/gram, and particularly preferred aramid fibers will have a tenacity of at least about 20 g/d, and an energy-to-break of at least about 20 joules/gram. Most preferred aramid fibers will have a tenacity of at least about 20 g/denier, a modulus of at least about 900 g/denier and an energy-to-break of at least about 30 joules/gram. For example, poly(phenylenediamine terephalamide) filaments produced commercially by Dupont Corporation under the trade name of Kevlar® 29 and 49 and having moderately high moduli and tenacity values are particularly useful in forming ballistic resistant composites. (Kevlar® 29 has 500 g/denier and 22 g/denier and Kevlar® 49 has 1000 g/denier and 22 g/denier as values of modulus and tenacity, respectively). Also useful in the practice of this invention is poly(metaphenylene isophthalamide) filaments produced commercially by Dupont under the trade name Nomex®.

In the case of liquid crystal copolyesters, suitable fibers are disclosed, for example, in U.S. Pat. Nos. 3,975,487; 4,118,372 and 4,161,470.

The high strength fiber network is impregnated with or embedded in a matrix composition by applying the matrix composition to the high strength fibers and then consolidating the matrix composition/fibers combination. By "consolidating" is meant that the matrix material and the fiber network layer are combined into a single unitary layer. Consolidation can occur via drying, cooling, pressure or a combination thereof. Typically, however, consolidation is achieved substantially, if not completely, by drying.

After consolidation, the matrix composition of the invention includes at least one thermoset vinyl ester and diallyl phthalate. Preferably, the vinyl ester is one produced by the esterification of a polyfunctional epoxy resin with an unsaturated monocarboxylic acid, usually methacrylic or acrylic acid. Illustrative vinyl esters include diglycidyl adipate, diglycidyl isophthalate, di-(2,3-epoxybutyl) adipate, di-(2,3-epoxybutyl) oxalate, di-(2,3-epoxyhexyl) succinate, di-(3,4-epoxybutyl) maleate, di- (2,3-epoxyoctyl) pimelate, di-(2,3-epoxybutyl) phthalate, di-(2,3-epoxyoctyl) tetrahydrophthalate, di-(4,5-epoxy-dodecyl) maleate, di-( 2,3-epoxybutyl) terephthalate, di-(2,3-epoxypentyl) thiodipropronate, di-(5,6-epoxy-tetradecyl) diphenyldicarboxylate, di-(3,4- epoxyheptyl) sulphonyldibutyrate, tri-(2,3-epoxybutyl)-1,2,4-butanetricarboxylate, di-(5,6-epoxypentadecyl)maleate, di-(2,3-epoxybutyl)azelate, di-(3,4-epoxypentadecyl) citrate, di-(4,5-epoxyoctyl) cyclohexane-1,3-dicarboxylate, di-(4,5-epoxyoctadecyl)malonate, bisphenol-A-fumaric acid polyester and similar materials.

The vinyl ester matrix material should have a tenacity of about 10,000 to 50,000 psi ($6.9 \times 10^4$ to $3.4 \times 10^5$ kPa), a tensile modulus of about $1 \times 10^6$ to $3 \times 10^6$ psi ($6.9 \times 10^6$ to $2.1 \times 10^7$ kPa), a Tg (as evidenced by a sudden drop in the ductility and elasticity of the material) of less than about 165° C., and an elongation-to-break of about 2 to 14%. Particularly preferred are vinyl esters available from Dow Chemical Co.

As mentioned previously, the matrix material typically is applied to the fiber network in the form of a solution. Prior to this invention, if an epoxy-based vinyl ester resin was desired as the matrix material, it was diluted with a compound having an unsaturated carbon-carbon double bond (e.g., styrene) and this dilution was mixed with a curing catalyst and additional solvents. The resulting solution was applied to the fiber network and dried to remove the unsaturated carbon-carbon double bond and the additional solvents. The remaining or post-consolidation matrix composition consisted of substantially all vinyl ester with only a trace amount of the styrene. Such a system is described in U.S. Pat. No. 5,165,989.

The problem with such a system is that the carbon double bond unsaturated organic solvent that was required to be removed have high boiling points. Consequently, the temperature and amount of oven residence time required were substantial. For example, a common conventional unsaturated solvent is styrene, which has a boiling point of 145° C. In order to volatilize the styrene, the vinyl ester-impregnated fiber network must be pre-heated and transported through an oven approximately 30 m long at an oven temperature of 110°–140° C. According to the present invention, it is not necessary to remove a high boiling point, unsaturated solvent.

It has been found that if a matrix composition system that includes vinyl ester, diallyl phthalate and a low boiling point (boiling point less than 115° C., preferably less than 90° C.), carbon-carbon saturated organic solvent is used, it is not necessary to remove a high boiling point, unsaturated solvent. The diallyl phthalate acts as a crosslinking agent and can remain in the matrix composition after consolidation.

The low boiling point, carbon-carbon saturated organic solvent can be a lower ($C_1$–$C_5$) alcohol, a lower ketone ($C_3$–$C_{10}$), a lower ($C_1$–$C_5$) acetate, or a combination thereof. As used herein, "carbon-carbon saturated" denotes a compound wherein all the bonds between carbon atoms are single bonds. In other words, a carbon-carbon saturated compound does not include any unsaturated carbon-carbon double bonds. Preferred solvents include methyl ethyl ketone, acetone, ethanol, methanol, isopropyl alcohol, cyclohexane, ethyl acetone, and combinations thereof. A catalyst for curing the vinyl ester resin may also be present in the matrix composition applied to the fiber network. Suitable catalysts, by way of example, include tert-butyl perbenzoate, 2,5-dimethyl-2,5-di-2-ethylhexanoylperoxyhexane, benzoyl peroxide and combinations thereof. After consolidation, there is only a trace, if any, of the low boiling point solvent and catalyst.

Since the matrix composition system of the present invention does not require the removal of a high boiling point solvent, the required oven temperature is only about 90°–120° C., preferably 90°–100° C., and the oven length is only about 8 to 14 m. The advantage of the shorter oven length is that the alignment of the fiber network does not tend to alter substantially as it passes through the oven. In ovens reaching up to about 30 m the dimensional stability of the individual fibers tends to diminish. Consequently, the fibers begin to have random curves and kinks that compromise the intended fiber alignment.

The matrix composition applied to the fiber network should include about 35 to 65, preferably about 45 to 55, weight % vinyl ester, about 2 to 8, preferably about 3 to 6, weight % diallyl phthalate, with the remainder consisting of low boiling point solvent, based on the total weight of the composition. If a curing catalyst is present, it should constitute about 0.05 to 1.0 weight %, preferably about 0.2 to 0.8 weight %. After consolidation, the matrix composition should include about 5 to 15, preferably about 8 to 12, weight % diallyl phthalate, based on the total weight of matrix composition, with the remainder consisting essentially of vinyl ester.

The matrix composition may be compounded with fillers such as carbon black, silica, glass microballoons, etc. up to an amount not to exceed about 300% by weight of the matrix composition, preferably not to exceed 100% by weight.

A simple composite can be formed from the matrix-impregnated high strength fiber networks. "Simple composite" is intended to denote an article that includes at least one fiber network combined with a single major matrix material to form a unitary layer, whether or not there are other materials present such as fillers, lubricants or the like. Simple composite materials may be constructed and arranged in a variety of forms.

The matrix-impregnated fiber network also can be used to form more complex composites. For example, the composite can include a second matrix material in addition to the vinyl ester. In a preferred embodiment the second matrix material is in the form of a film which is adjacent to at least one side of the matrix-impregnated fiber network. The matrix-impregnated fiber network can be pressed or embedded into the second matrix material so that the second matrix material at least partially encompasses the impregnated fibers.

Among second matrix material films which can be used in the invention are thermoplastic polyolefins, thermoplastic elastomers, crosslinked thermoplastics, crosslinked elastomers (e.g., ethylene propylene diene and butyl rubber), polyester, polyamide, fluorocarbon, urethane, epoxy, polyvinylidene chloride, and polyvinyl chloride. Homopolymers or copolymers of these films preferably are uniaxially or biaxially oriented.

It is especially preferred that the film be made of high density polyethylene (preferably having a melting point of about 105° C.), polypropylene, or a blend of polyethylene and styrene-isoprene-styrene block copolymer (available from Raven Industries). Such a film acts as an oxygen barrier, provides surface modification and allows for the separation of individual layers after they have been manufactured prior to molding of the final article.

In the preferred case of high density polyethylene film, a film thickness of about 4 to 80 μm, preferably 15 to 25 μm, is used and a pressure of about 0.001 to 1.5 kg/mm$_2$, and a temperature, preferably of about 60° to 400° C., more preferably 100° to 160° C., are employed for pressing the impregnated fiber network into the film.

It is convenient to characterize the geometries of such composites by the geometries of the fibers. One such suitable arrangement is a fiber network layer in which the fibers are aligned parallel to one another along a common fiber direction (referred to herein as a "unidirectionally aligned fiber network"). Successive layers of such unidirectionally aligned fibers can be rotated with respect to the previous layer. Preferably, the fiber network layers of the composite are crossplied, that is, with the fiber direction of the unidirectional fibers of each network layer rotated with respect to the fiber direction of the unidirectional fibers of the adjacent layers. An example is a five layer article with the second, third, fourth and fifth layers rotated +45°, −45°, 90° and 0° with respect to the first layer. A preferred example includes two layers with a 0°/90° layup. Such rotated unidirectional alignments are described, for example, in U.S. Pat. Nos. 4,457,985; 4,748,064; 4,916,000; 4,403,012; 4,623,573; and 4,737,402.

In general, the composite of the invention is formed by applying the matrix composition to the high strength fibers and then consolidating the matrix material/fibers combination.

For example, the fiber or yarn can be transported through a solution of the matrix composition to substantially coat the fiber or yarn and then dried to form a coated fiber or yarn. The resulting coated fiber or yarn can then be arranged into the desired network configuration to form a layer of ballistic resistant material. Alternatively, the fiber network can be constructed initially and then coated with the matrix composition or embedded into a film of the matrix composition.

The fiber networks can be constructed via a variety of well known methods. In the preferred case of unidirectionally aligned fiber networks yarn bundles of high strength filaments, preferably having about 30 to about 2000 individual filaments of less than about 12 denier, and more preferably of about 100 individual filaments of less than about 7 denier, are supplied from a creel and led through guides and a spreader bar into a collimating bar prior to coating or impregnating with the matrix material. The collimating comb aligns the filaments coplanarly and in a substantially unidirectional fashion.

The fiber network layers typically contain from about 6 to 12 fiber ends per inch (2.4 to 4.7 ends per cm) and preferably 8 to 11 ends per inch (3.2 to 4.3 ends per cm). Each layer (including matrix material) is typically from about 0.01 to 0.2, preferably about 0.04 to 0.12, and most preferably about 0.06 to 0.10, mil (mm) thick.

In the instances of a simple composite where the matrix composition is supplied in the form of a film, U.S. Pat. No. 5,173,138, hereby incorporated by reference, describes a method for making the matrix material-impregnated fibrous network of the present invention. This method includes feeding a matrix film onto at least one side of the fiber network layer while heating for a time sufficient to impregnate the fiber network with the film without damaging the fibers and physical properties of the resin matrix.

Alternatively, the fiber network layer can be sandwiched between release papers, one of which is coated with the wet matrix composition. This system is then passed under a series of pressure rolls to complete the impregnation of the fibers. The top release paper is pulled off while the impregnated network of fibers is subjected to heat to remove the solvent from the matrix composition.

The preferred method, however, includes initially forming the fiber network layer, preferably a unidirectional network as described above, applying a solution of the matrix composition onto the fiber network layer, and then drying the matrix-impregnated fiber network layer as described, for example, in U.S. Pat. No. 4,820,568, incorporated herein by reference. As shown in FIG. 1, yarn is supplied from a creel 102 and passed through a combing station 104 to form the fiber network. The fiber network then is placed on a carrier web which can be a paper or a film substrate 106. The matrix composition is applied to the fiber network layer by coating a solution of the matrix composition onto the fiber network layer at 108. The coated fiber network then is passed through a pair of rollers 110. The rollers spread the matrix composition substantially uniformly among the fibers. The impregnated fiber network layer is then passed through a heated oven 112 for drying. Nip roller 114 is used to control final layer thickness. Nip roller 116 is used to pull the carrier web and prepreg through the system. The substrate and the impregnated fiber network layer can then be wound on roller 118. In the oven, the impregnated fiber network layer is subjected to sufficient heat to volatilize the solvent for the matrix composition.

If the second matrix material is desired, a preferred method for making the fiber network layer employs a separate film of a second matrix material upon which the high strength fiber or yarn is disposed and then coated. More specifically, the high strength fibers are transported through a comb means which collimates the fibers to form a unidirectionally aligned fiber network. The unidirectional fibers are laid onto a moving film of the second matrix material. A solution of the vinyl ester-containing matrix composition then is coated onto the fibers which are laying on the film, thereby adhering the fibers to the film. The vinyl ester-containing matrix composition may penetrate between the fibers and the film and should occupy substantially all the void space between the fibers, although some void spaces may remain. The vinyl ester-containing matrix composition is subsequently dried. The coating and drying steps can be repeated to achieve the desired amounts of matrix material relative to the amount of fiber. An apparatus for carrying out this method is described in U.S. Pat. No. 5,149,391, hereby incorporated by reference.

The proportion of matrix composition to fiber in the composite may vary widely, depending upon the end use. If the density of the matrix composition is similar to that of the fiber, then the matrix composition may generally form from about 10 to about 40% by weight, preferably about 14 to 30%, more preferably 16 to 28%, and most preferably about 20 to 24%, based on the weight of an individual layer or the final composite. For ballistic resistant composite articles, the preferred range is up to 28% by weight. If the densities of the matrix composition and fiber are dissimilar, then the matrix composition may form from about 5 to about 40% by volume, preferably about 6 to 30%, more preferably 7 to 24%, and most preferably about 8 to 22%, based on the volume of an individual layer or the final composite. In the embodiments which include a second matrix material, then the vinyl ester matrix material may generally form from about 5 to about 35% by weight, preferably about 10 to 28%, and most preferably about 20 to 24%, and the second matrix material may correspondingly generally form from about 5 to about 30% by weight, preferably about 6 to 14% by weight, more preferably 7 to 14%, and most preferably about 8 to 12%, based on the weight of the layer or the final composite.

The individual consolidated fiber network layers can be laid up into a stack for formation into the end use composite or they can be formed into a prepreg element which is subsequently used to form the end use composite. By "end use composite" is meant the integral multi-layer composite which is used in an article such as a helmet or vehicle armor plates. As mentioned previously, the most preferred composite is one wherein the fiber network of each layer is unidirectionally aligned and oriented so that the fiber directions in adjacent layers are in a 0°/90° configuration.

In the most preferred embodiment, two fiber network layers are cross-plied in the 0°/90° configuration and then molded to form a prepreg element. The two fiber network layers can be continuously crossplied, preferably by cutting one of the networks into lengths that can be placed successively across the width of the other network in a 0°/90° orientation. U.S. Pat. No. 5,173,138 describes an apparatus for continuous cross-plying. As described in PCT Publication No. WO 91/12136, the resulting continuous ply can then be wound into a roll with a layer of separation material between each ply. The roll is then subjected to pressure and/or heat in order to adhere the two cross-plied fiber networks together.

The temperatures and/or pressures to which the fiber network layers are exposed for molding vary depending upon the type of high strength fiber used. The end use composite for use in armor panels can be made by molding a stack of fiber network layers or prepreg elements under a pressure of about 150 to 400, preferably about 180 to 250, psi and a temperature of about 220° to 260° F. The end use composite for use in helmets can be made by molding a stack of fiber network layers or prepreg elements under a pressure of about 1500 to 3000, preferably about 1800 to 2200, psi and a temperature of about 220° to 260° F.

The following examples are presented to demonstrate the advantages of the invention. The specific techniques, conditions, materials, proportions and reported data set forth to illustrate the principles of the invention are exemplary and should not be construed as limiting the scope of the invention.

The total areal density (ADT) indicates the weight of fiber and matrix material per unit area of an individual fiber network layer.

Fragment ballistic testing of the examples was performed in accordance with Military Specification MIL-P-662E using a 17 grain fragment simulation projectile (FSP) in accordance with the specifications of Military Specification MIL-P-46593A. The protective power of the sample is expressed by citing the impacting velocity at which 50% of the projectiles are stopped which is designated the $V_{50}$ value.

EXAMPLE 1

A unidirectionally aligned network of 1300 denier extended chain polyethylene yarn available from AlliedSignal under the tradename Spectra® 1000 was coated with 5000 g of a solution mixture available from Dow Chemical Co. that consisted of 63 weight % vinyl ester, 31 weight % methyl ethyl ketone and 6 weight % diallyl phthalate. This solution mixture was combined with 35 g of 2,5-dimethyl-2,5-di-2-ethylhexanoylperoxyhexane (commercially available from Atochem North America under the tradename Lupersol 256) and 1900 g of methyl ethyl ketone available from Industrial Chemical. The vinyl ester has a reported tenacity of 20,700 psi, a tensile modulus of $1.74 \times 10^6$ psi, and an elongation-to-break of 5–6%. The coated network was then passed through an oven to volatilize and remove the methyl ethyl ketone. The dried fiber network layer had 20% by weight of matrix composition and 78% by weight fiber. Two of these network layers were stacked in a 0°/90° fiber alignment and molded four times for a period of 5 minutes at a temperature of 150° F. and a pressure of 100 psi to form a prepreg element. Thirteen layers of these prepreg elements were stacked and molded at a temperature of 240° F. and a pressure of 400 psi for a period of 10 minutes in order to make a panel. The areal density of the panel was 1.45 lb/ft$^2$. The panel was tested as described above against a FSP and found to have a $V_{50}$ of 2148 ft/sec.

EXAMPLE 2

Another panel was made as described in Example 1 and it had an areal density of 1.37 lb/ft$^2$. The $V_{50}$ against an FSP was 2050 ft/sec.

EXAMPLE 3

Using 13 layers of prepreg elements made as described in Example 1, a military-type helmet was molded in a matched-die steel mold. The surface area of the helmet was 1.29 ft$^2$. The outside and inside of the helmet consisted of a fabric layer of woven 1200 denier extended chain polyethylene yarn available from AlliedSignal under the tradename Spectra® fabric style 903 that had been coated with a vinyl ester resin available from Dow Chemical Co. under the tradename DERAKANE 411-45. The weight of the helmet shell was 2.14 lbs. Forty-eight hours after molding, the helmet was tested against a FSP as described above and was found to have a $V_{50}$ of 2317 ft/sec.

EXAMPLE 4

Another military-type helmet was made according to the procedure described in Example 3. The weight of the helmet shell was 2.22 lbs and the resistance against FSP fragment was 2280 ft/sec.

From the foregoing description, one skilled in the art can easily ascertain the essential characteristics of this invention, and without departing from the spirit and scope thereof, can make various changes and modifications of the invention to adapt it to various usages and conditions.

We claim:

1. An article comprising at least one consolidated network of high strength fibers in a matrix composition, the high strength fibers having a tenacity of at least about 7 g/d, a tensile modulus of at least about 150 g/d and an energy-to-break of at least about 8 J/g, wherein prior to consolidation the matrix composition comprises at least one thermoset vinyl ester, diallyl phthalate, and at least one carbon-carbon saturated solvent, said solvent being substantially removed during consolidation, and said thermoset vinyl ester having a tenacity of about 10,000 to 50,000 psi ($6.9 \times 10^4$ to $3.4 \times 10^5$ kPa), a tensile modulus of about $1 \times 10^6$ to $3 \times 10^6$ psi ($6.9 \times 10^6$ to $2.1 \times 10^7$ kPa), a $T_G$ of less than about 165° C., and an elongation-to-break of about 2 to 1.4%.

2. An article according to claim 1, wherein the high strength fibers are selected from at least one of the group consisting of extended chain polyolefin fibers, aramid fibers, polyvinyl alcohol fibers, polyacrylonitrile fibers, liquid crystal copolyester, glass and carbon fibers.

3. An article according to claim 1, wherein the high strength fibers comprise extended chain polyethylene fibers.

4. An article according to claim 1, wherein the high strength fibers have a tenacity of at least about 22 g/d, a tensile modulus of at least about 900 g/d and an energy-to-break of at least about 27 J/g.

5. An article according to claim 1, wherein the vinyl ester comprises a reaction product of a polyfunctional epoxy resin and an unsaturated monocarboxylic acid.

6. An article according to claim 5, wherein the vinyl ester is selected from the group consisting of diglycidyl adipate, diglycidyl isophthalate, di-(2,3-epoxybutyl) adipate, di-(2,3-epoxybutyl) oxalate, di-(2,3-epoxyhexyl) succinate, di-(3,4-epoxybutyl) maleate, di-(2,3-epoxyoctyl) pimelate, di-(2,3-epoxybutyl) phthalate, di-(2,3-epoxyoctyl) tetrahydrophthalate, di-(4,5-epoxy-dodecyl) maleate, di-(2,3-epoxybutyl) terephthalate, di-(2,3-epoxypentyl) thiodipropronate, di-(5,6-epoxy-tetradecyl) diphenyldicarboxylate, di-(3,4-epoxyheptyl) sulphonyldibutyrate, tri-(2,3-epoxybutyl)-1,2,4-butanetricarboxylate, di-(5,6-epoxypentadecyl)maleate, di-(2,3-epoxybutyl) azelate, di-(3,4-epoxypentadecyl) citrate, di-(4,5-epoxyoctyl) cyclohexane-1,3-dicarboxylate, di-(4,5-epoxyoctadecyl) malonate and bisphenol-A-fumaric acid polyester.

7. An article according to claim 1, wherein after consolidation the matrix composition comprises about 5 to 15 weight % diallyl phthalate and the remainder vinyl ester, based on the total weight of the matrix composition.

8. An article according to claim 1, comprising at least two adjacent layers of the high strength fiber network in the matrix composition, wherein the fibers of each layer are unidirectionally aligned and the fiber direction of at least one fiber network layer is rotated at an angle of about 90° relative to the fiber direction of the adjacent fiber network layer.

9. An article according to claim 8, wherein the vinyl ester comprises a reaction product of a polyfunctional epoxy resin and an unsaturated monocarboxylic acid.

10. An article according to claim 1, wherein the article is a ballistic resistant composite.

11. The article of claim I wherein the carbon-carbon saturated solvent is selected from the group consisting of an alcohol that contains 1 to 5 carbon atoms, a ketone that contains 3 to 10 carbon atoms and an acetate that contains 1 to 5 carbon atoms.

12. The article of claim 1 wherein the carbon-carbon saturated solvent is selected from the group consisting of methyl ethyl ketone, acetone, ethanol, methanol, isopropyl alcohol, cyclohexane and ethyl acetone.

13. The article of claim 12 wherein the carbon-carbon saturated solvent is methyl ethyl ketone.

14. A prepreg element comprising at least two consolidated adjacent layers of a network of high strength fibers in a matrix composition, the high strength fibers having a tenacity of at least about 7 g/d, a tensile modulus of at least about 150 g/d and an energy-to-break of at least about 8 J/g, wherein prior to consolidation of the coated high strength fiber networks the matrix composition comprises at least one thermoset vinyl ester, diallyl phthalate, and at least one carbon-carbon saturated solvent, said solvent being removed during consolidation, and said thermoset vinyl ester having a tenacity of about 10,000 to 50,000 psi ($6.9 \times 10^4$ to $3.4 \times 10^5$ kPa), a tensile modulus of about $1 \times 10^6$ to $3 \times 10^6$ psi ($6.9 \times 10^6$ to $2.1 \times 10^7$ kPa), a $T_G$ of less than about 165° C., and an elongation-to-break of about 2 to 14%.

15. A prepreg element according to claim 14, wherein the high strength fibers are selected from at least one of the group consisting of extended chain polyolefin fibers, aramid fibers, polyvinyl alcohol fibers, polyacrylonitrile fibers, liquid crystal copolyester, glass and carbon fibers.

16. A prepreg element according to claim 15, wherein the high strength fibers comprise extended chain polyethylene fibers.

17. A prepreg element according to claim 14, wherein the vinyl ester comprises a reaction product of a polyfunctional epoxy resin and an unsaturated monocarboxylic acid.

18. A prepreg element according to claim 17, wherein the vinyl ester is selected from the group consisting of diglycidyl adipate, diglycidyl isophthalate, di-(2,3-epoxybutyl) adipate, di-(2,3-epoxybutyl) oxalate, di-(2,3-epoxyhexyl) succinate, di-(3,4-epoxybutyl) maleate, di-(2,3-epoxyoctyl) pimelate, di-(2,3-epoxybutyl)phthalate, di-(2,3-epoxyoctyl) tetrahydrophthalate, di-(4,5-epoxy-dodecyl) maleate, di-(2,3-epoxybutyl) terephthalate, di-(2,3-epoxypentyl) thiodipropronate, di-(5,6-epoxy-tetradecyl) diphenyldicarboxylate, di-(3,4-epoxyheptyl) sulphonyldibutyrate, tri-(2,3-epoxybutyl)-1,2,4-butanetricarboxylate, di-(5,6-epoxypentadecyl)maleate, di-(2,3-epoxybutyl) azelate, di-(3,4-epoxypentadecyl) citrate, di-(4,5-epoxyoctyl) cyclohexane-1,3-dicarboxylate, di-(4,5-epoxyoctadecyl) malonate and bisphenol-A-fumaric acid polyester.

19. A prepreg element according to claim 14, wherein after consolidation the matrix composition comprises about 5 to 15 weight % diallyl phthalate and the remainder vinyl ester, based on the total weight of the matrix composition.

20. A prepreg element according to claim 14, wherein the fibers of each fiber network layer are unidirectionally aligned and the fiber direction of at least one fiber network layer is rotated at an angle of about 90° relative to the fiber direction of the adjacent fiber network layer.

21. The prepreg element of claim 14 wherein the carbon-carbon saturated solvent is selected from the group consisting of an alcohol that contains 1 to 5 carbon atoms, a ketone that contains 3 to 10 carbon atoms and an acetate that contains 1 to 5 carbon atoms.

22. The article of claim 14 wherein the carbon-carbon saturated solvent is selected from the group consisting of methyl ethyl ketone, acetone, ethanol, methanol, isopropyl alcohol, cyclohexane and ethyl acetone.

23. The article of claim 22 wherein the carbon-carbon saturated solvent is methyl ethyl ketone.

* * * * *

UNITED STATES PATENT AND TRADEMARK OFFICE
CERTIFICATE OF CORRECTION

PATENT NO. : 5,552,208
DATED : September 3, 1996
INVENTOR(S) : Lin et al.

It is certified that error appears in the above-identified patent and that said Letters Patent is hereby corrected as shown below:

Col. 11, line 24, "1.4%" should read --14%--.

Col. 12, line 41, "cidyI" should read --cidyl--.

Signed and Sealed this

Nineteenth Day of November, 1996

Attest:

BRUCE LEHMAN

Attesting Officer

Commissioner of Patents and Trademarks